United States Patent [19]

Frissell

[11] Patent Number: 4,935,828
[45] Date of Patent: Jun. 19, 1990

[54] SEEK MULTITASKING DISK CONTROLLER

[75] Inventor: John M. Frissell, Dracut, Mass.

[73] Assignee: Wang Laboratories, Inc., Lowell, Mass.

[21] Appl. No.: 213,430

[22] Filed: Jun. 30, 1988

[51] Int. Cl.$^5$ .................. G11B 21/08; G06F 13/00
[52] U.S. Cl. .................... 360/78.04; 360/69; 360/98.01; 364/200; 364/271.5
[58] Field of Search ............ 360/69, 78.04, 98.01, 360/31, 72.1, 72.2, 75; 369/32–34, 41; 364/200, 900

[56] References Cited

U.S. PATENT DOCUMENTS

| 4,087,843 | 6/1978 | Louis et al. | |
| 4,125,882 | 11/1978 | Erickson et al. | 360/78.04 |
| 4,310,882 | 1/1982 | Hunter et al. | 364/200 |
| 4,563,715 | 1/1986 | Kawamura et al. | 360/78.04 |

OTHER PUBLICATIONS

NEC Electronics, Inc., PD 71054: Programmable Time/Counter, Feb. 1985.
American National Standards Institute, Inc., Storage Module Interfaces, 1987.

Primary Examiner—Aristotelis M. Psitos
Assistant Examiner—Steven R. Garland
Attorney, Agent, or Firm—Michael H. Shanahan

[57] ABSTRACT

A method and apparatus for increasing the performance of disk drive access by delaying a pending data transfer operation to an individual disk drive until immediately before the start of the target sector so as to allow servicing of an intervening seek operation to another disk drive.

3 Claims, 7 Drawing Sheets

SEEK MULTITASKING DISK CONTROLLER

1. Field of the Invention

The present invention relates generally to digital computer systems and more specifically to computer systems employing two or more rotating disk storage devices, for example, magnetic or optical disk drives. Even more particularly, the invention relates to method and apparatus for reducing the time required to accomplish head positioning across a disk surface on two separate disk drives.

2. Background of the Invention

The current invention is implemented in conjunction with the American National Standard Institute's Storage Module Interface standard. The ANSI designation for this standard is X3.91M and this standard published by the American National Standard Institute, Inc. of New York, N.Y. is incorporated by reference in this application. This standard, commonly known as the SMD standard, facilitates the interconnection of high performance disk drives and the disk control unit and thus provides a common device interface specification for both controller and disk drive suppliers.

The SMD standard permits up to sixteen disk drives to be controlled by a disk control unit. The disk control unit has the responsibility of managing the access by a host computer system to data stored on the disk drives. Before a command may be issued to a particular disk drive that drive must be selected or addressed by the disk control unit. The standard stipulates that only one disk drive can be selected at any time by its associated disk control unit and that disk drive must be deselected before another data transfer command can be issued to a separate disk drive.

There are two significant types of disk commands, seek commands and data transfer commands. The seek command involves moving the drive read/write heads to a desired disk track position. After the seek command begins, a first drive may be deselected and other commands such as seek or data transfer may initiated to other drives while the seek is being executed at that first drive.

If seek commands are to be issued to other drives, they can be issued in parallel. Most control units support this performance enhancement called "overlapped seeks". The amount of time required to execute or complete the seek command is dependent on how far the read/write heads are moved. A typical range for a drive is 5 to 50 milliseconds. When the seek completes, a completion signal called "seek end" will be received from the drive over the SMD interface.

Data transfer commands write data to the surface of the disk drive, or read data from the surface of the disk drive at the current track number that the read/write heads are over. Each track is composed of a number of "sectors". Each sector contains a block of data. For each disk drive attached to the control unit, the apparatus that controls the operations of the disk drives, the SMD interface provides a sector mark and an index mark. The sector mark and index mark signals are commonly referred to as "sector pulse" and "index pulse" since they are short (1 to 5 microseconds) pulses. The sector pulse indicates the start of each sector on a track. The index pulse denotes the start of the first sector, sector 0, of a track. The sector pulses in combination with the index pulse are used by the control unit to create a "sector counter" to provide read/write head positioning feedback for each disk drive. The index pulse clears the counter and the sector pulses increment the counter. Thus the control unit can determine at any time what sector the read/write heads are over by checking the value of the sector counter.

When the control unit is directed to transfer data to "sector i", the control unit will issue the data transfer command immediately after receiving the sector pulse for "sector i-1". The command is issued after the reception of the "sector i-1" pulse so as to insure that the control unit logic is ready upon arrival of the "sector i" pulse which triggers the operation.

Activity to any other drive is locked out while the logic waits for the "sector i" pulse, and then when the data transfer is active. Thus if a data transfer command is initiated to a drive at the beginning of "sector i 1", and immediately a seek command is requested for another disk drive, this seek command will not be issued until the data transfer has completed. For a single sector data transfer command this can take as much as two sector times, the sector time for "sector i-1" when the operation is primed to go and the data transfer time for "sector i". This delay directly impacts the performance of the seek command since it can not be issued until the data transfer completes. Thus when a data transfer command is to be isssued which involves a multiple sector transfer the seek command must be postponed until the completion of all the requested sector are transferred.

SUMMARY OF THE INVENTION It is an object of the invention to decrease the amount of time that a disk control unit is incapable of issuing commands to a disk drive under its control due to an outstanding data transfer command.

Another object of the present invention is to increase the throughput of seek commands from the a disk control unit to its associated disk drives.

A further object of the invention is to determine in an efficient manner whether it is too late to start a data transfer request for a sector because there is not enough time to issue the command before encountering the upcoming sector.

This invention provides apparatus for overcoming the performance limitations associated with prior disk access strategies. When the control unit determines that a data transfer command can be started to a drive (i.e. the read/write heads are positioned over sector i-1), the control unit then checks how far into the sector the read/write heads have traveled, therefore knowing how much time is left before the next sector pulse will occur.

Disk sector timing circuitry is added to the control unit to provide this timing information. If the amount of time left is greater than a threshold value, Q, then the command is not immediately issued. The command will be postponed to a time immediately preceding the next sector pulse. The control unit subsequently modifies its operating state to reflect the delay of the data transfer command and does any housekeeping required for the future execution of the command.

While in this delay state, there is now the possibility that the control unit can execute requested seek commands since the selection of the drive for the data transfer command has been postponed and thus the SMD interface is free for other use.

To determine if the seek command can be issued, the control unit determines from the disk sector timer if there is sufficient time to issue the seek command before the data transfer command must be executed, thus insuring that there is no conflict between the competing seek and data transfer requests.

BRIEF DESCRIPTION OF THE DRAWINGS

Other objects, advantages, and features of the present invention will be understood by those of ordinary skill in the art after referring to the complete written description of the preferred embodiment in conjunction with the drawings, wherein.

DETAILED DESCRIPTION

Figure 1:
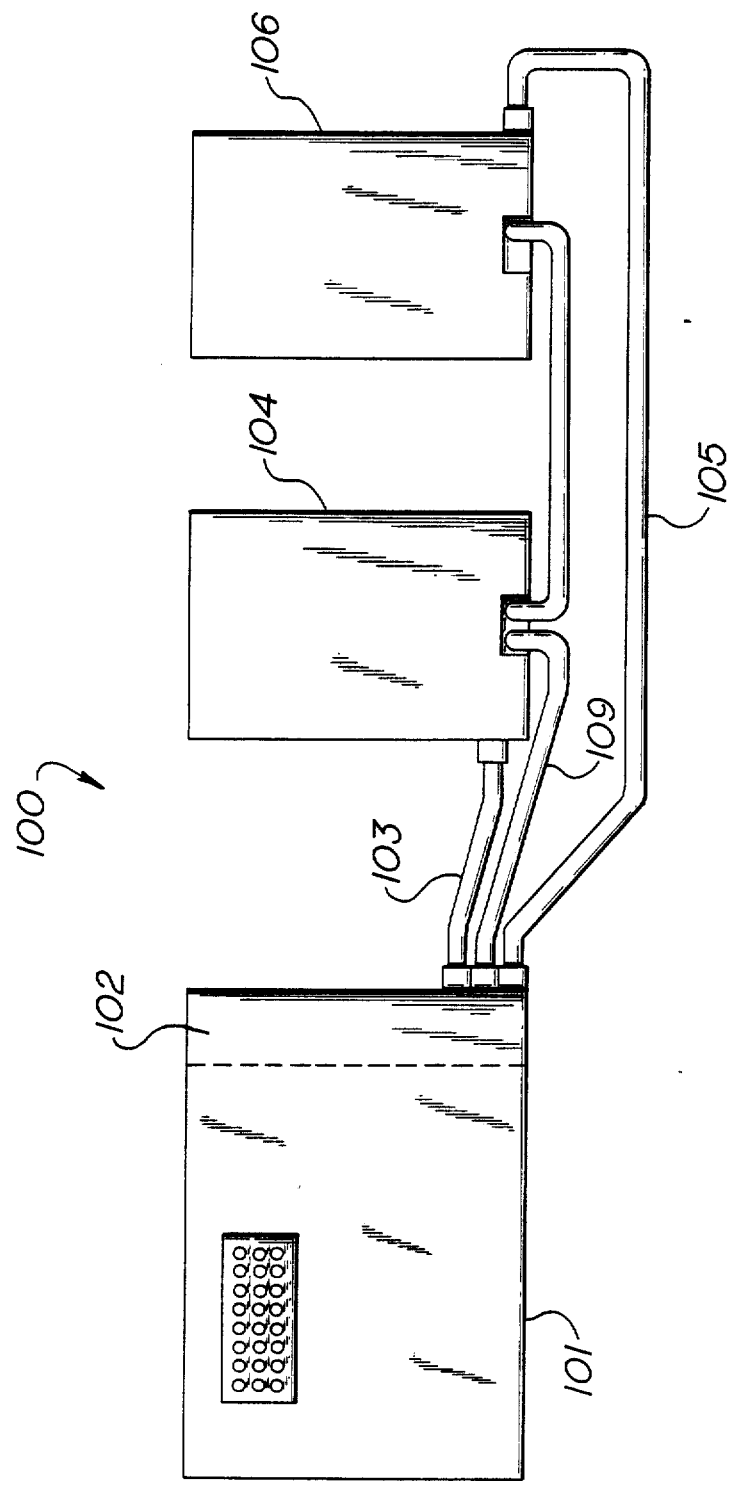
FIG. 1 is a diagram of a computer system having a host computer, a disk representative control unit imbedded within the computer system housing, and two disk drives adhering to the ANSI SMD interface to which the present invention has application.

Referring now to FIG. 1. The following description presents the structure and operation of a computer system 100 incorporating the presently preferred embodiment of the invention. A host computer system 101 for performing calculations and manipulating data is connected via a disk control unit 102 to a multiplicity of disk drives 104 and 106.

A first connection to the first disk drive 104 from the data processing system 101 via the disk control unit 102 is made by a dedicated read/write cable 103. This cable transfers data requested for read and write operations on disk drive 104. The second disk drive 106 in FIG. 1 is coupled to the disk control unit 102 by its own read write cable 105 for read and write operations.

Each disk drive has its own dedicated read/write cable which is radially connected to disk control unit 102. Control signals are passed from disk control unit 102 to disk drives 104 and 106 via a separate control cable 109 which connects serially to disk drives 104 and 106. Each disk drive coupled to disk control unit 102 is connected serially to control cable 109. A person skilled in the art will recognize that the potential number of disk drives connected to a control unit 102 is not limited to two. The depiction of two disk drives 104 and 106 was chosen for convenience and is exemplary in nature only. Likewise although only one control unit 102 is depicted in FIG. 1, multiple control units 102 may be connected to a data processing system 101, each connected to a multiplicity of disk drives.

Disk control unit 102 controls the operation and access of data requests from data processing system 101 to disk drives 104 and 106. Thus a disk operation directed to either disk drive 104 or disk drive 106 by host computer 101 is first passed to disk control unit 102, which issues the appropriate disk command to the respective disk drive.

Disk drives 104 and 106 house one or more magnetic platters upon which data may be stored and subsequently read.

Figure 2:
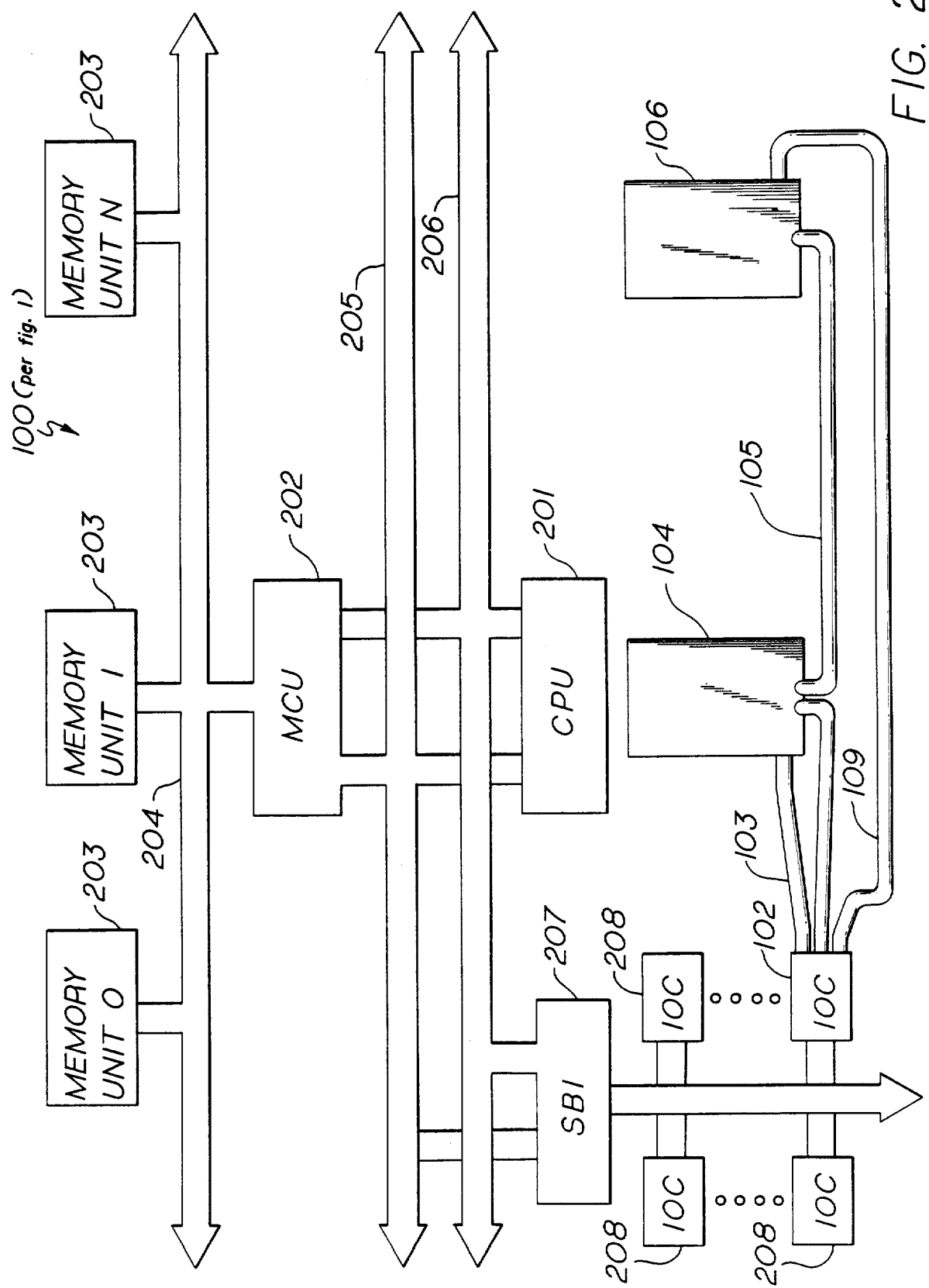
FIG. 2 is a block diagram representation of one example of a host computer having a central processor, main memory, system bus, input/output bus, disk control unit structures, and two disk drives controlled in accordance with the present invention.

Referring to FIG. 2, the host computer system 101 and the disk control unit 102 connection to disk drives 104 and 106 is shown in more detail.

Central Processing Unit 201 or CPU provides for calculation and data manipulation functionality in host computer system 101. The CPU 201 is coupled to the main memory 203. The main memory stores data that is read and written between the memory and the CPU 201, via the Memory Control Unit 202. The MCU controls the operation of reads and writes of data from and to the associated memories 203 coupled together via memory bus 204. The CPU 201 and Memory 203 interface to the Input Output Controllers IOC,208, for the purpose of transmitting and receiving data external to the data processing system 101. The Memory 203 and CPU 201 are coupled to the IOCs 208 via the System Data Bus 205, the System Address Bus 206, the System Bus Interface (SBI) 207, and the Input Output/Bus 210. The System Bus Interface 207 arbitrates access of the IOCs 208 to the CPU and memory via the System Data Bus 205 and the System Address Bus 206.

The Input Output Controllers 208 are processors that control specific classes of peripheral devices that are external to data processing system 101. Disk Control Unit 102 is an example of such an IOC 208 and is particularly shown in FIG. 2 as IOC 102. The Disk Control Unit 102 is coupled to Disk Drives 104 and 106 via Disk Cable Connectors 103, 105 and 109, which have been described previously in this specification.

Figure 3:
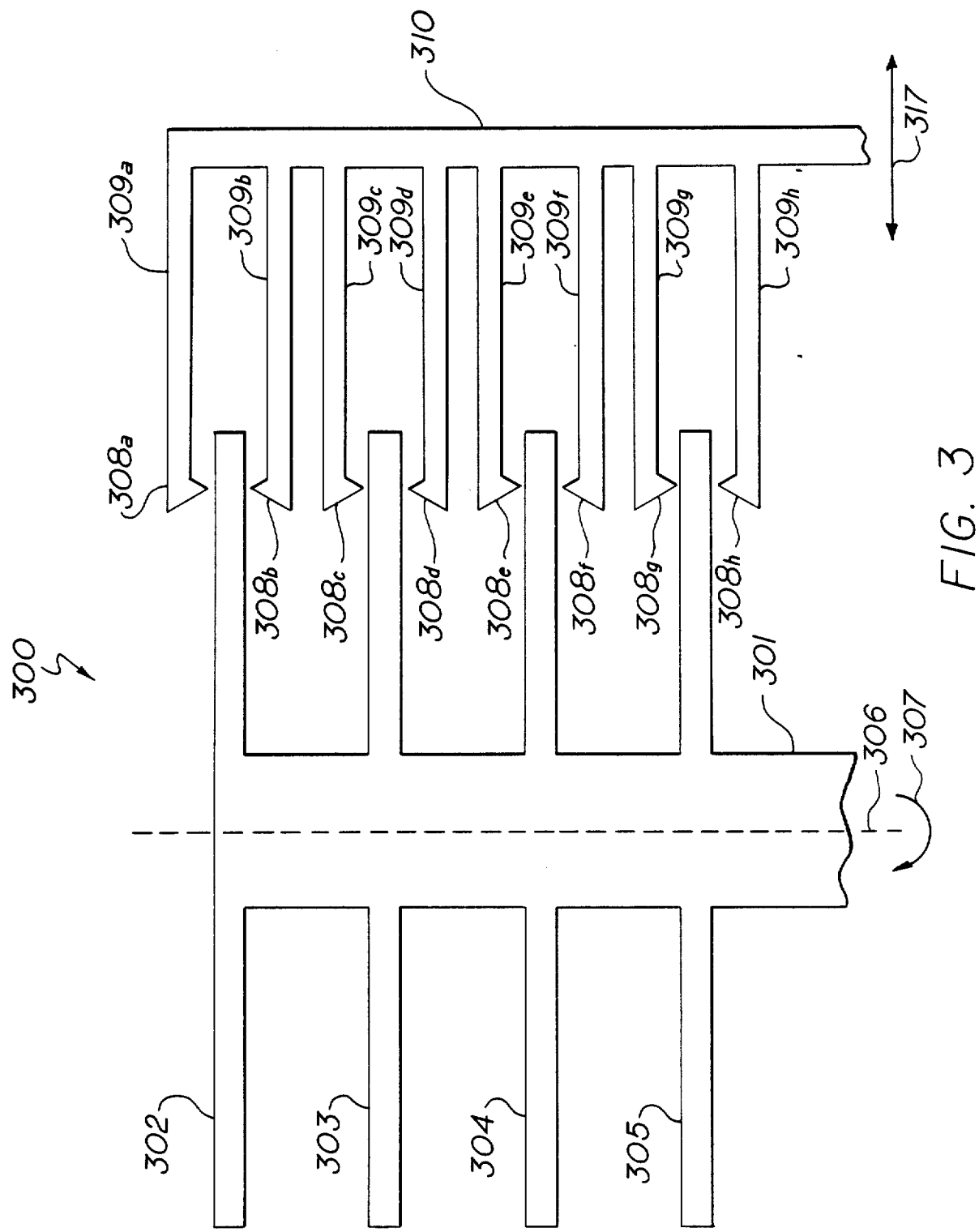
FIG. 3 is a diagramatic representation of a side, cross sectional view of the spindle, platters or disks, read/write heads, and comb like supporting arms for the read/write heads used in magnetic disk drive systems.

Referring to FIG. 3, a subassembly 300 of a disk drive 104, for example, is illustrated in cross section. One or more Disk Platters 302, 303, 304, and 305, each capable of recording information on the platter surface, are stacked vertically and are fixedly coupled to spindle 301. Spindle 301 is rotatable about an axis 306 perpendicular to the Disk Platters 302, 303, 304, and 305, and in normal operation, the Spindle 301 and Disk Platters rotate at a very high angular velocity in direction 307. The Disk Platters 302, 303, 304, and 305 are circular in shape and typically information is recorded on both the top and bottom surfaces. However, a person skilled in the art will recognize that information may be recorded on just the top or bottom surface alone. Information is recorded on or read from the surface of the Disk Platter 302, 303, 304, or 305 by means of read/write heads 308a–308h. The Read/write heads are attached to arm 310 by members 309a–309h. Arm 310 moves back and forth horizontally as indicated by arrow 317 allowing the read/write heads 308a–308h to be positioned at any radial position of the Disk Platter surface 302, 303, 304, or 305.

Again, a person skilled in the art will recognize that not all read/write heads 308a–308h need to be connected to a single arm 310 but may be connected to separate arms and thus two or more arms are capable of independent movement.

Figure 4:
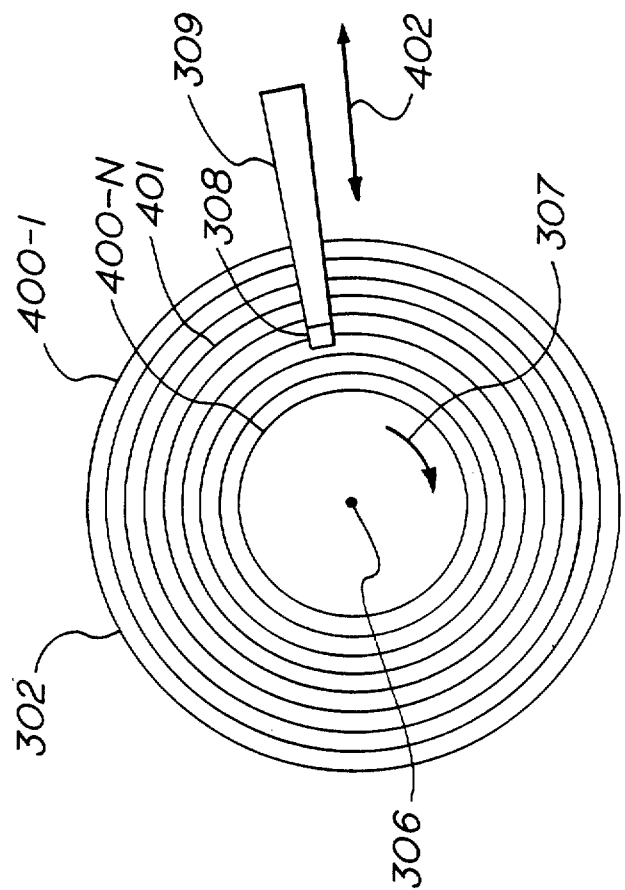
FIG. 4 is a top or plan view of a disk surface, depicting a plurality of concentric tracks on disks of the type represented in cross-section in FIG. 3.

Referring now to FIG. 4, top views are shown of Disk Platter 302, read/write head 308, and arm assembly 309. The Disk Platter 302 is composed of one or more concentric tracks 400-1 through 400-N. A specific track is indicated in FIG. 4 by reference number 401. On each track 400-1 through 400-N separate information may be recorded and read. By radial movement, for example, of the arm 309 relative to the circular disk platter 302, the read/write heads 308 may be positioned over a particular track 401 and information read or recorded. The direction of movement of the arm 309 is indicated by the arrow 402.

Figure 5:
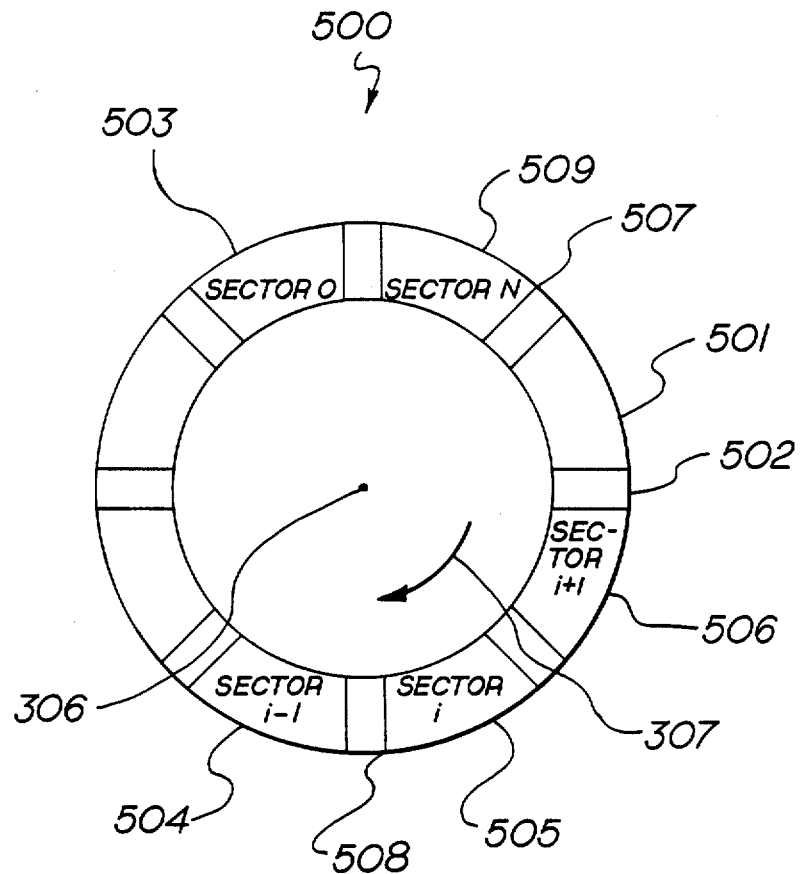
FIG. 5 is a representational drawing in plan view of a single track on a disk of the type represented in FIG. 4, illustrating sectors and the spacing between sectors.

Referring now to FIG. 5, a representation of how sectors are ordered within a representative track 401 is depicted. Track 401 is shown as divided into its sector subcomponents. The preferred embodiment for the current invention utilizes fixed length sectors comprising a prefix of 53 bytes which includes the track and sector address, 2048 bytes of user data, and a 225 byte postamble including an error correcting code. Thus the total sector length is 2326 bytes long. The sectors associated with a particular track are numbered starting from sector zero, identified with reference number 503, and increasing by one for each additional sector. In FIG. 5, there are depicted N+1 sectors. The last sector on the track is sector N, identified with reference number 509. This number is dependant on the amount of data a track can hold and the length of each sector. At the end of each sector there exists an area of the track referred to as the "inter sector gap" that does not contain any date or address information.

This null area begins at the end of the sector data and continues until the beginning of the next sector. In the preferred embodiment the inter sector gap 502 is an area of hexidecimal zeros evenly distributed over the track which accounts for the difference between the total data capacity of the track and the sum of the sector lengths.

With a particular disk drive 104 selected by the disk control unit 102 and the read/write heads properly positioned over a desired track, an index pulse signal will be transmitted from the disk drive 104 to the control unit 102 when the read/write heads 308a–308h encounter the start 507 of sector zero when the disk platter is rotating in the direction shown by arrow 307. Additionally when the read/write heads 308a–308h encounter the beginning 508 of an arbitrary sector i, identified by reference number 505, a sector pulse signal is transmitted from the disk drive 104 to the disk control unit 102. The sector pulse is used by the disk control unit 102 to ready for the start of a data transfer operation, since all data transfer operations need to start at this reference point. The sector pulse and index pulse are used by the disk control unit 102 to create a "sector counter" to provide head positioning feedback for each disk drive 104. The disk control unit 102 can determine at any time what sector the read/write heads 303 are over by checking the "sector counter". The index pulse clears the sector counter to sector number zero and each sector pulse increments the counter by one.

A data transfer operation to a particular sector, whether it involves a read or write command must be initiated from the disk control unit 102 to the disk drive 104 before rotation of the disk platter to the desired sector, under a read/write head, is achieved. A data transfer directed to disk drive 104, during a data transfer operation, will be commenced at the start of the targeted sector which is identified by its sector pulse.

Figure 6:
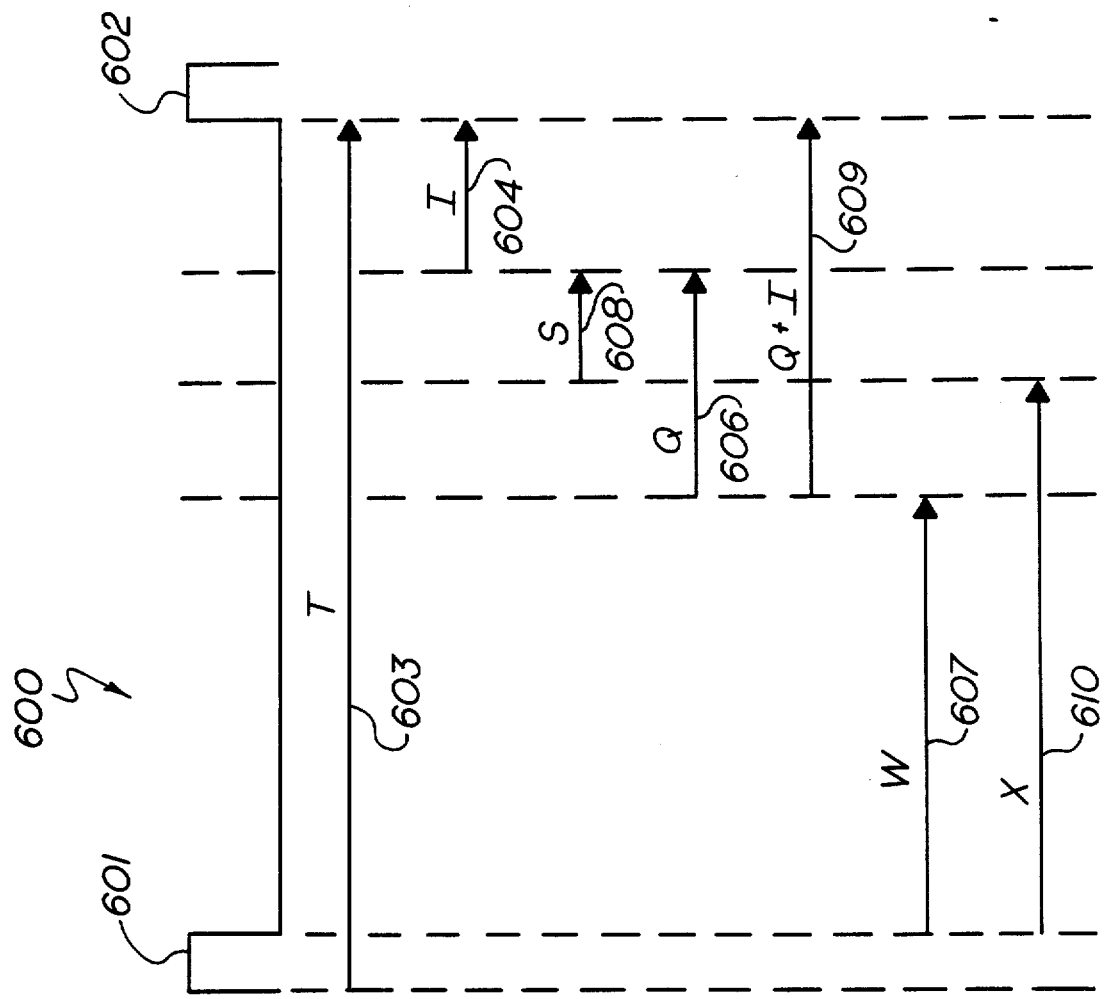
FIG. 6 is a drawing depicting the relative timing of various control signals generated during the rotation of the disk, and used to control the issuance of disk commands.

Referring now to FIG. 6 a timing diagram describing the delay of a data transfer command and the issuance of an intervening seek command is depicted. Time T, represented by arrow 603, is the total elapsed time during the rotation of sector i-1, represented by reference number 504, and its ending inter sector gap 502 past, for example, read/write head 308a. The start of time T is marked on the leading edge of for example sector pulse 601 for sector i-1 504 and is terminated at the beginning of the sector pulse 602 for sector i 505.

According to the SMD specification, a sector or index pulse has a duration varying from 1 to 5 microseconds.

Any data transfer command for transfer of sector i 505 data initiated by the host computer system 101 before the reception of the sector pulse 601 by control unit 102 for sector i-1 504 or executed by the host computer system during sector i-1, which is subsequently initiated while the read/write head 308a is within the bounds of sector i-1 504 and greater than I time 604 remains before reception of the sector pulse 602 for sector i 505 will be started by the control unit for transfer of data at the next sector i pulse 602.

If less than I time 604 remains before reception of the sector i pulse 602, then the data transfer command will not be started since there is not enough time to perform the housekeeping necessary to start the operation before the sector i pulse 602. If this is the only sector to be transferred, a complete rotation of the track 401 will be required before the command can be started. In the preferred embodiment I time is 110 microseconds but one skilled in the art will recognize that this time is dependant on the disk control unit's speed of execution and the amount of housekeeping required to initiate the data transfer command to the disk drive 104.

A data transfer command accepted by the disk control unit 102 while the read/write head 308a is positioned within sector i-1 504 and greater than Q+I time 609 away from the sector pulse 602 for sector i 505 will not be immediately executed but will be deferred and later executed at I time 604 before the sector i pulse 602. In FIG. 6 this window of time when the data transfer command will be delayed is identified as W time 607. In the preferred embodiment Q time is 256 microseconds but one skilled in the art will recognize that this time is dependant on optimization of the execution performance of the disk control unit 102.

It must be remembered that once a data transfer command is issued to the disk drive 104 it is no possible for the disk control unit 102 to issue either data transfer or seek commands to other disk drives until the original data transfer command completes. Thus the deferral of a data transfer command initiation allows an intervening seek command to be issued to another disk drive 106 during X time 610. The postponed data transfer command will be initiated at I time 604. A typical time to issue the seek command S time 608, including the overhead of setting up the command, is in the neighborhood of 60 microseconds. An intervening seek command received after the start of S time 608 will not be executed immediately but will be held until after the data transfer request is completed since there is not enough time to guarantee that the seek command can be issued and still execute the data transfer command before the sector i pulse 602 is received.

Figure 7:
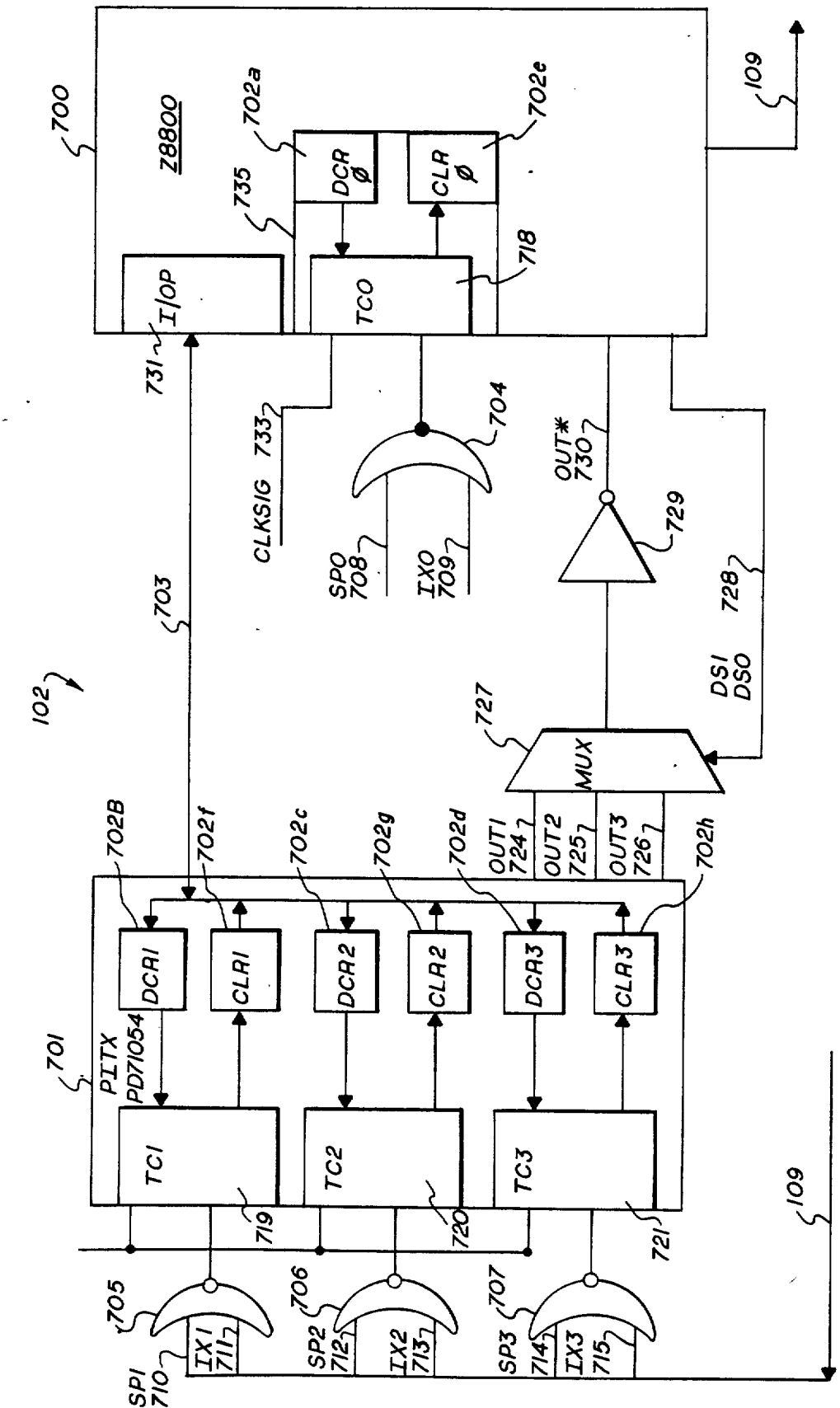
FIG. 7 is one embodiment of a circuit for controlling disk command generation pursuant to the present invention.

Turning now to FIG. 7 for a description of the disk sector timer circuitry in the disk control unit 102. The disk sector timer is implemented through use of a general purpose microprocessor 700 including a Central Processing Unit CPU that provides calculation and input output capability. The microprocessor that is utilized in the present invention is a Z8800 available from Zilog. However one skilled in the art will recognize that an alternative microprocessor could be utilized to practice the invention and there is no intent to limit the invention to solely a Z8800 microprocessor. In the preferred embodiment of the invention the microprocessor 700 includes a programmable interrupt timer PITM 735 that interrupts the CPU when a predetermined time has elapsed.

In the event that the general purpose microprocessor 700 does not include an internal PITM 735 a separate component providing the same functionality PITX, programmable interrupt timer external, 701 can be utilized. The present invention utilizes a 8254 Programmable Timer/Counter available from Intel. However one skilled in the art will recognize that an alternative programmable timer could be utilized to practice the invention and there is no intent to limit the invention to a particular programmable timer. Each programmable interrupt timer 735 or 701 has one or more Timer Counters, TC0 718, TC1 719, TC2 720, and TC3 721 which are loaded to an initial value and decremented according to a free running clock, 734 for PITX 701 and 733 for PITM 735.

Each disk drive 104 or 106 connected to disk control unit 102 has associated a Timer Counter in the PITM or PITX. FIG. 7 depicts a disk control unit 102 with one Timer Counter TC0 718 in the microprocessor 700 and three TC1 719, TC2 720, and TC3 721 in the PITX 701. However one skilled in the art will recognize that more Timer Counters can be utilized by either cascading PITX 701 components or utilizing a microprocessor 700 with multiple Timer Counters.

I will now describe the input and operation of the Timer Counters by reference to Timer Counter 1 719. The operation of the other Timer Counters is equivalent.

Timer Counter 1 719 is loaded with an initial value supplied by microprocessor 700 through its Input Output Port IOP 731. This initial value corresponds to the time from a sector pulse 601 or index pulse to the start of I time 604. The value is communicated by bidirectional lines 703 and stored initially in a Data Counter Holding Register DCR 702b in the PITX 701 before presentment to Timer Counter 1 719. Each Timer Counter 718, 719, 720, and 721 has an associated DCR 702a–702d. Once Timer Counter 1 is loaded with the time value, it will start its decrementing process when a either a sector pulse signal SP1 710 or Index pulse signal IX1 711 is presented to NOR gate 705.

Timer Counter 1 719 will decrement according to a free-running clock signal CLKSIG 734. Each clock cycle will decrement Timer Counter 1 by one. Upon presentation of a new sector pulse signal SP1 710 or index pulse signal IX1 711 Timer Counter 1 718 will be reloaded with its initial value and the decrementing process will restart again.

Each Timer Counter also has a Counter Latch Register (CLR) 702e through 702h which can capture and hold the current count of the Timer Counter. The microprocessor 700 can read this captured count over the bidirectional lines 703.

The level of the OUT1 signal 724 represents the state of the Timer 1 Counter. This signal is multiplexed with the other OUT signals 725 and 726 and passed through inverter 729 to produce a OUT* 727 signal, which can be read by the microprocessor 700. The microprocessor 700 through use of the DS0 and DS1 lines 728 can select any of the OUT lines to be presented on OUT* 730.

When Timer 1 Counter decrements to zero the level of the OUT1 724 line will transition from a low to high state and remain in a high state until the the Timer Counter is reloaded at the next sector or index pulse. Thus if the OUT1 724 line is selected to be read by the microprocessor 700 and the read/write heads are positioned within I time of a sector pulse OUT* 730 will be low.

When the disk control unit 102 is within sector i-1 504 and wants to do a data transfer on sector i 505 to disk drive 104 it can quickly check the status of the multiplexed OUT* signal 730. If this signal is low then the time to sector pulse i 602 is less than I time 604 and the operation can not be started. If the signal is high then the exact time left needs to be determined.

The current contents of Timer 1 Counter 719 can be read by microprocessor 700. This is accomplished by latching the contents of Timer 1 Counter 719 in CLR1 702f thus allowing the microprocessor to read the captured Timer 1 Counter 718 via interface lines 703. If the time value is larger than Q time 606 then the data transfer command will be postponed to allow for any possible intervening seek operations. The data transfer command will be postponed and issued by the disk control unit 102 when the selected OUT* signal 730 goes low signaling the start of I time 604.

While the invention has been particularly shown and described with reference to the preferred embodiment thereof, it will be understood by those skilled in the art that various changes in form and details may be made therein without departing from the spirit and scope of the invention.

What is claimed is:

1. A data transfer system, comprising:
   a plurality of rotational disk drive means including one or more disk platters partitioned into a plurality of sectors for storing information, including read/write means for retrieving and storing said information;
   each disk drive means further including a position detector means for determining a plurality of predetermined positions of the read/write means relative to the rotation of the disk platter of a disk drive means, and a first communication means for transmitting an indication of the predetermined positions of the read/write means and for receiving data transfer and seek commands, wherein a seek command is used to initiate movement of the read/write meas radially across the disk platter;
   disk control unit means coupled to a disk drive means for controlling the operation of the disk drive including a second communication means for receiving the indication of the predetermined positions of the read/write means and for transmitting data transfer commands and seek commands, to the disk drive means;
   disk control unit means further including timing means responsive to the position detector means of said disk drive means for determining rotational time to a particular sector;
   said disk control unit means still further including delay means for deferring transmission to the disk drive means of a pending data transfer command for accessing data in sector i-1;
   wherein during the time for which the transmission of the data transfer command is deferred subsequent seek command addressed to another disk drive means is transmitted.

2. A data transfer system as recited in claim 1 wherein the disk control unit means is coupled to a host computer system including a central processing unit, (CPU), memory for storing information to be used by the central processing unit, and a bus for communicating with other components of the host computer system.

3. A method of balancing seek and data transfer commands from a disk control unit to a disk drive comprising:

postponing the issuance of a data transfer command from a disk control unit to a first disk drive when a data transfer command is received by the disk control unit while the read/write head of the disk drive is within a boundary of a sector preceding a sector that the data transfer command is to operate on and while the read/write head is greater than $Q+I$ time away from a sector pulse associated with the sector the data transfer command is to operate on, issuing a seek command from the disk control unit to a disk drive other than the first disk drive while the data transfer command is postponed, issuing the data transfer command to the first disk drive at I time before the sector pulse of the sector that the data transfer command is to operate on.

* * * * *